(12) United States Patent
Takeuchi et al.

(10) Patent No.: US 8,537,437 B2
(45) Date of Patent: Sep. 17, 2013

(54) IMAGE READING APPARATUS (75) Inventors: Masaru Takeuchi, Aichi (JP); Katsuro Miura, Aichi (JP); Takayuki Akimatsu, Aichi (JP); Takashi Fujiwara, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 186 days.

(21) Appl. No.: 13/043,564

(22) Filed: Mar. 9, 2011

(65) Prior Publication Data

US 2011/0242621 A1    Oct. 6, 2011

(30) Foreign Application Priority Data

Mar. 30, 2010   (JP) .................. 2010-078667

(51) Int. Cl.
*H04N 1/21*   (2006.01)
*H04N 1/04*   (2006.01)

(52) U.S. Cl.
USPC ........... 358/498; 358/482; 358/497; 358/296; 358/474

(58) Field of Classification Search
USPC .......................... 358/498, 482, 497, 296, 474
See application file for complete search history.

(56) References Cited

U.S. PATENT DOCUMENTS

| 6,975,436 | B2 | 12/2005 | Saito |
| 7,224,495 | B2 | 5/2007 | Yui et al. |
| 7,428,081 | B2 | 9/2008 | Yamauchi |
| 7,969,621 | B2 | 6/2011 | Shunji |
| 2002/0054361 | A1 | 5/2002 | Saito |
| 2002/0171880 | A1 | 11/2002 | Yui et al. |
| 2003/0002889 | A1 | 1/2003 | Kohchi |
| 2003/0147105 | A1 | 8/2003 | Yamauchi |
| 2007/0201100 | A1* | 8/2007 | Ikeno et al. ................... 358/296 |
| 2008/0068679 | A1 | 3/2008 | Murai |

(Continued)

FOREIGN PATENT DOCUMENTS

| CN | 1438800 A | 8/2003 |
| CN | 101150644 A | 3/2008 |

(Continued)

OTHER PUBLICATIONS

JP Office Action dtd Sep. 25, 2012, JP Appln. 2010-078667, English translation.

(Continued)

*Primary Examiner* — Charlotte M Baker
*Assistant Examiner* — Rury Grisham
(74) *Attorney, Agent, or Firm* — Banner & Witcoff, Ltd.

(57) ABSTRACT

An image reading apparatus having a lower unit with a controller and an upper unit rotatably attached to the lower unit to rotate about a rear end of the upper unit is provided. The upper unit includes a sheet conveyer, an upper image reader connected with the controller via a flat cable, and an external covering. A rearward-extending section of the flat cable extends rearward from the upper image reader and is drawn in an area below a part of a frame of the sheet conveyer and to a rear section of the upper unit to reach an inner surface of the external covering at the rear end of the upper unit. A width-wise-extending section of the flat cable extends from the rear end of the upper unit along the inner surface of the external covering in a direction orthogonal to reach an outlet of the upper unit.

7 Claims, 6 Drawing Sheets (56) References Cited

U.S. PATENT DOCUMENTS

| | | | |
|---|---|---|---|
| 2008/0180760 A1* | 7/2008 | Andoh et al. | 358/497 |
| 2009/0225375 A1* | 9/2009 | Iwata | 358/474 |
| 2010/0014127 A1 | 1/2010 | Osakabe et al. | |
| 2010/0165424 A1* | 7/2010 | Maeda | 358/498 |
| 2011/0211236 A1* | 9/2011 | Nagasaka | 358/482 |

FOREIGN PATENT DOCUMENTS

| | | |
|---|---|---|
| JP | HEI 02-101868 A | 4/1990 |
| JP | 2001-057611 A | 2/2001 |
| JP | 2001-197232 A | 7/2001 |
| JP | 2001-238014 A | 8/2001 |
| JP | 2002-031862 A | 1/2002 |
| JP | 2002044321 A | 2/2002 |
| JP | 2002-171047 A | 6/2002 |
| JP | 2002-199156 | 7/2002 |
| JP | 2002-344703 A | 11/2002 |
| JP | 2003-015235 | 1/2003 |
| JP | 2003078719 A | 3/2003 |
| JP | 2003-233138 A | 8/2003 |
| JP | 2005-300796 | 10/2005 |
| JP | 2006278753 A | 10/2006 |
| JP | 2007-281718 A | 10/2007 |
| JP | 2007-287407 A | 11/2007 |
| JP | 2007336451 A | 12/2007 |
| JP | 2008118200 A | 5/2008 |
| JP | 2009-153086 A | 7/2009 |
| JP | 2009-216828 A | 9/2009 |
| JP | 2009-260476 A | 11/2009 |
| JP | 2010-028465 A | 2/2010 |

OTHER PUBLICATIONS

EP Office Action dated Aug. 29, 2011; EP Application No. 11001948.6.

JP Office Action dtd Feb. 7, 2012, JP Appln. 2010-078667, English translation.

CN Office Action mailed Jun. 27, 2013, CN Appln. 201110088458.3, English translation.

* cited by examiner

IMAGE READING APPARATUS

CROSS REFERENCE TO RELATED APPLICATION

This application claims priority from Japanese Patent Application No. 2010-078667, filed on Mar. 30, 2010, the entire subject matter of which is incorporated herein by reference.

BACKGROUND

1. Technical Field

An aspect of the present invention relates to an image reading apparatus.

2. Related Art

An image reading apparatus having a lower unit with a controller and an upper unit on top of the lower unit, in which the upper unit is rotatable to open with respect to the lower unit, is known. The image reading apparatus may be provided with an image sensor in each of the upper unit and the lower unit and with an automatic document feeder (ADF) to convey a sheet of source document in a path between the two image sensors so that images on both sides of the source document can be read by the two image sensors.

When the image sensor in the upper unit reads the image, image data representing the read image may be transmitted from the upper unit to the controller in the lower unit via a data transmission cable connecting the upper unit and the lower unit. The cable to connect the upper unit and the lower unit may be arranged on a rear side of the image forming apparatus.

SUMMARY

The cable connecting the upper unit and the lower unit may be arranged in one of various layouts within the upper unit whilst the upper unit may include a plurality of kinds of components, additionally to the data transmission cable, such as a wire harness to supply driving power to a motor of the ADF, rollers and movable parts in the ADF, and frames to hold the movable parts. When arrangement of the data transmission cable is complicated, in which the data transmission cable is drawn to detour the rollers and the frames, the cable may be undesirably twisted or bended and damaged.

Further, due to the openable/closable (rotatable) structure of the upper unit, a part of the data transmission cable in a further section within the upper unit, further from a rotation axis of the upper unit, may be moved in a greater amount according to the opening/closing movement of the upper unit. The largely-movable part of the cable may be subjected to external force and joggle the cable undesirably. Thus, the cable may be stressed and damaged.

In view of the above, the present invention is advantageous in that an image reading apparatus having the lower unit and the upper unit, in which the stress to the data transmission cable in the upper unit is reduced, is provided.

According to an aspect of the present invention, an image reading apparatus to read an image formed on a document sheet is provided. The image reading apparatus includes a lower unit, an upper unit arranged on top of the lower unit and rotatably attached to the lower unit via a hinge to rotate about a rear end of the upper unit with respect to the lower unit, and at least one image reader configured to read the image formed on the document sheet. The upper unit includes a sheet conveyer, which conveys the document sheet in a sheet-feeding path, an upper image reader, which is one of the at least one image reader to read the image formed on the document sheet being conveyed, and an external covering to accommodate the sheet conveyer and the upper image reader. The lower unit includes a controller to control image processing of the image read by the at least one image reader. The sheet conveyer includes rollers, a driving source to drive the rollers, and a frame to support the rollers and the driving source. The at least one image reader and the controller are connected with each other via a flat cable. The flat cable connecting the upper image reader with the controller has a rearward-extending section and a widthwise-extending section. The rearward-extending section extends rearward from the upper image reader along a front-rear direction and is drawn in an area below a part of the frame and to a rear section of the upper unit to reach an inner surface of the external covering at the rear end of the upper unit. The widthwise-extending section extends from the rear end of the upper unit along the inner surface of the external covering in a direction orthogonal to front-rear direction to reach an outlet of the upper unit and is directed to the lower unit via the outlet.

DETAILED DESCRIPTION

Hereinafter, an embodiment of the present invention will be described with reference to the accompanying drawings. A multifunction peripheral device (MFP) 1 will represent an image reading device according to the present invention.

[Overall Configuration of the MFP]

The MFP 1 is equipped with a plurality of image processing functions, which include a scanning function, a printing function, a copier function, and a facsimile transmission/receiving function.

Figure 1A:
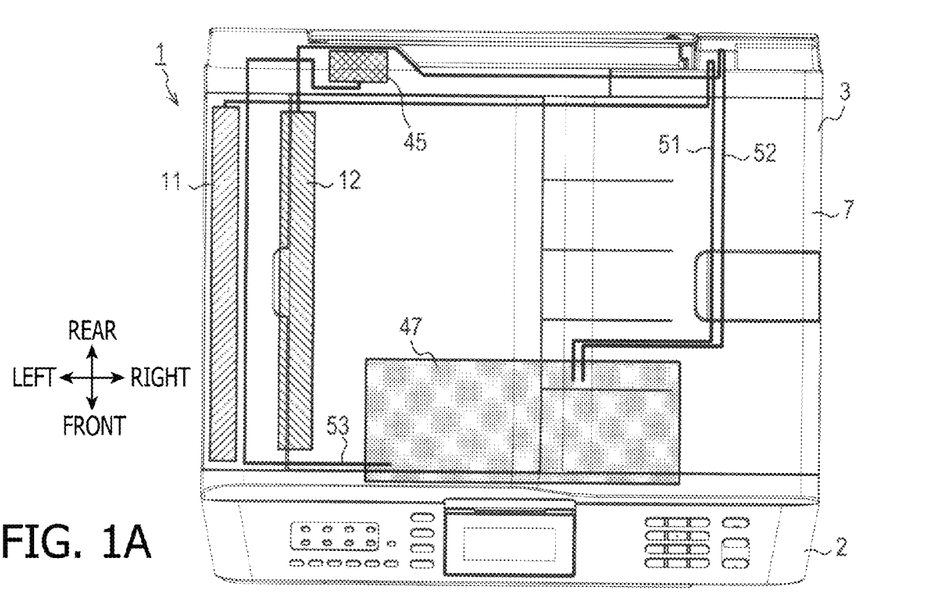
FIG. 1A is a plane view of a multifunction peripheral (MFP) having an image reading apparatus according to an embodiment of the present invention.

In the present embodiment, directions concerning the MFP 1 will be referred to in accordance with orientation indicated by arrows in the drawings. For example, a right-left direction of the MFP 1 appearing in FIG. 1A is referred to as a widthwise direction, and a front-rear direction of the MFP 1 appearing in FIG. 1A is referred to as a direction of depth. Further, an up-down direction of the MFP 1 appearing in FIGS. 1B and 1C is referred to as a direction of height.

Figure 1B:
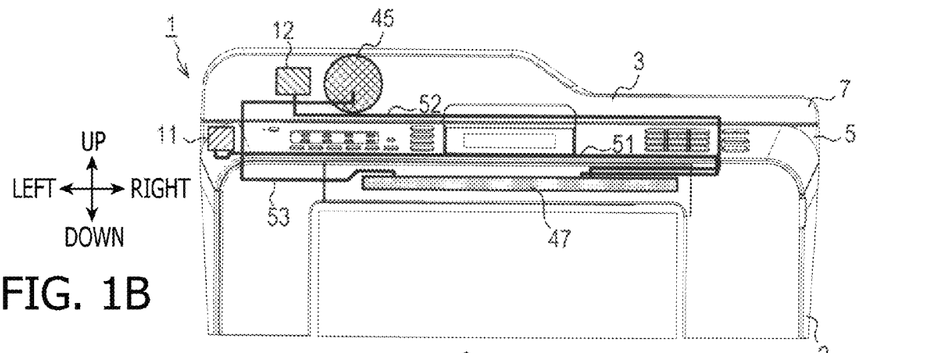
FIG. 1B is a front view of the MFP according to the embodiment of the present invention.
Figure 1C:
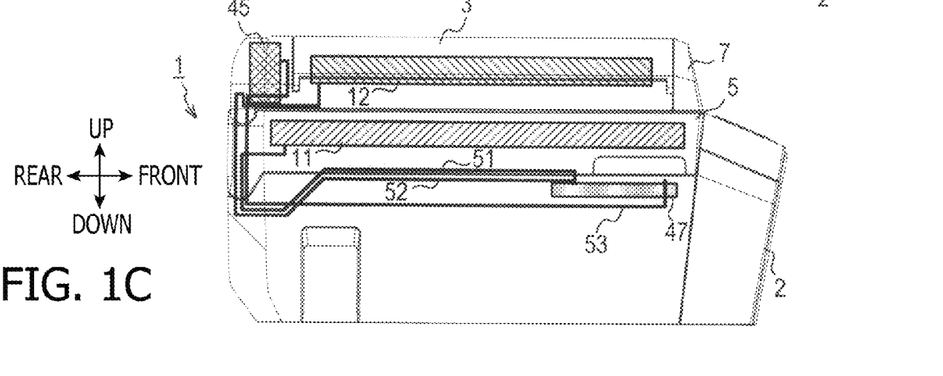
FIG. 1C is a left side view of the MFP according to the embodiment of the present invention.

FIGS. 1A-1C illustrate exterior appearance of the MFP 1 and a part of interior structure of the MFP 1. The MFP 1 includes a main unit 2 at a bottom and a scanner unit 3 on top of the main unit 2. The scanner unit 3 is rotatable about a lower rear edge thereof, which corresponds to an upper rear edge of the main unit 3, to be openable and closable with respect to the main unit 2. Thus, the scanner unit 3 can shift postures thereof between a closed position (see FIG. 1C) and an open position (not shown). When the scanner unit 3 is in the open position, a user can access an internal structure of the main unit 2 in order to, for example, repair and maintain operability of the main unit 2.

The scanner unit 3 includes a flatbed unit 5, on which a sheet of source document with an original image to be read can be set, and a cover unit 7, which covers a top of the flatbed unit 5. The cover unit 7 includes an external covering 57 (see FIG. 3) to accommodate a plurality of rollers and a second image sensor 12. The plurality of rollers and the second image sensor 12 will be described later in detail. The cover unit 7 is rotatable about a rear edge thereof and can shift postures thereof between a closed position (see FIGS. 1A-1C) and an open position (not shown) when a front part thereof is uplifted and lowered. Thus, when the cover unit 7 is in the open position, the sheet of source document can be placed between the flatbed unit 5 and the cover unit 7. Further, additionally to and separately from the rotating behavior, the cover unit 7 can shift positions thereof between a lower position (see FIG. 1A) and an upper position (not shown). Therefore, a document with thickness (e.g., a book) can be placed steadily between the flatbed unit 5 and the cover unit 7.

[Scanner Unit]

Figure 2:
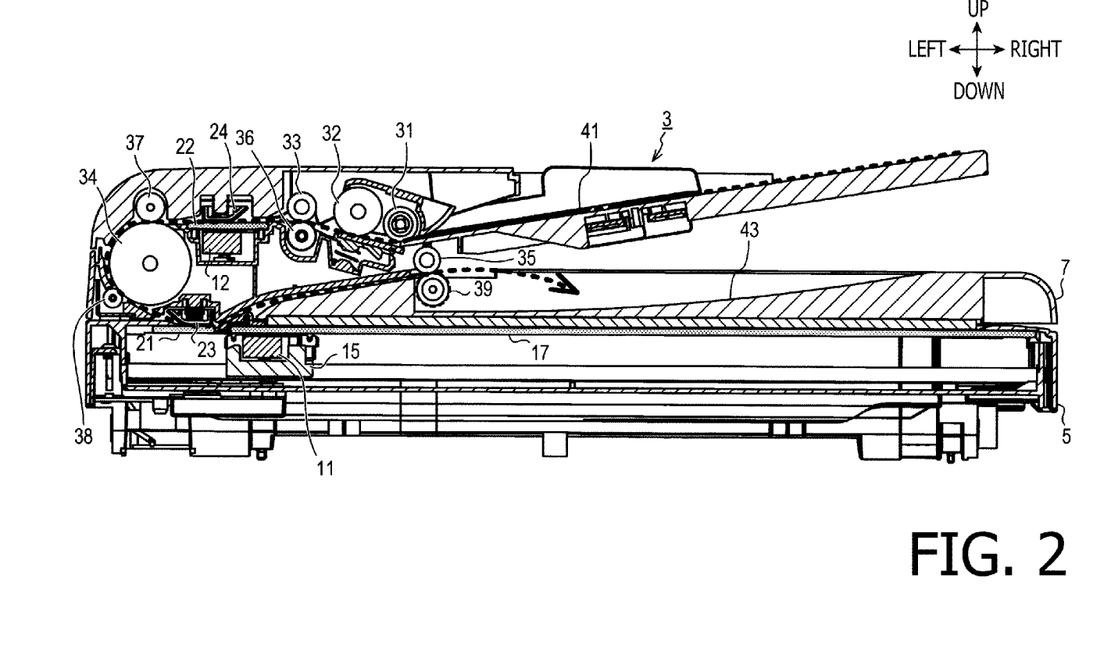
FIG. 2 is a cross-sectional front view of a scanner unit in the MFP according to the embodiment of the present invention.

The scanner unit 3 will be described hereinbelow in detail with reference to FIG. 2. The scanner unit 3 of the MFP 1 includes a first image sensor 11 and a second image sensor 12, which are contact image sensors to optically read images from the document and converts the images into electric signals representing the images. Within the scanner unit 3, the first image sensor 11 is arranged in the flatbed unit 5, and the second image sensor 12 is arranged in the cover unit 7.

The first image sensor 11 extends linearly in parallel with the front-rear direction of the MFP 1 (i.e., the direction of depth) and is mounted on a carriage 15, which is reciprocated in the flatbed unit 5 along a widthwise (right-left) direction. In an upper position with respect to the reciprocating path of the carriage 15, a piece of flatbed glass 17 is arranged. When the carriage 15 is driven in the widthwise direction, therefore, the first image sensor 11 is moved in the same direction along with the carriage 15 underneath the flatbed glass 17.

When the scanner unit 3 is used to serve as a flatbed scanner, the document sheet is placed on top of the flatbed glass 17. As the first image sensor 11 is moved in the right-left direction, a plurality of pixels aligned in lines orthogonally to the widthwise direction on the source document are scanned sequentially, and the image on the document sheet placed on the flatbed glass 17 is read. The read image is converted into electrical signals and transmitted to a controller (not shown) of a controller board 47 to be processed.

In the present embodiment, the direction of depth of the MFP 1 (see FIGS. 1A and 1C) is also referred to as a main scanning direction, and the direction in which the carriage 15 with the first image sensor 11 is moved is referred to as an auxiliary direction. The main scanning direction and the auxiliary direction are orthogonal to each other.

Above the reciprocating path of the first image sensor 11 and a left-hand side of the flatbed glass 17, a first ADF glass 21 is arranged on a same plane as the flatbed glass 17. Further, a second ADF glass 22 is arranged on an upper position with respect to the second image sensor 12. In an upper position with respect to the first ADF glass 21, a first presser piece 23 is arranged, and a second presser piece 24 is arranged in an upper position with respect to the second ADF glass 22.

The scanner unit 3 is provided with a plurality of rollers, which are driven by a driving source (not shown) to convey the document sheet in a sheet feeding path, in the cover unit 7. The rollers include a feed roller 31, a separator roller 32, an intermediate conveyer roller 33, a main conveyer roller 34, and a discharge roller 35. Further, a first nip roller 36, a second and third nip rollers 37, 38, and a fourth nip roller 39, which work in cooperation with the intermediate conveyer roller 33, the main conveyer roller 34, and the discharge roller 35 respectively, are arranged in positions opposite from the co-working rollers 33-35. The sheet feeding path is indicated by a thick broken arrow in FIG. 2.

When the scanner unit 3 is used to serve as an ADF-typed image scanner, the rollers 31-39 are driven, and the document sheet placed on a document holder 41 is fed in the sheet feeding path. In particular, sheets in the source document placed on the document holder 41 are picked up by the feed roller 31 to be conveyed downstream in the feeding path and separated from each other by the separator roller 32. The separated sheets are carried by the intermediate conveyer roller 33 to the main conveyer roller 34 one-by-one and turned around along an outer periphery of the main conveyer roller 34. The sheets are further conveyed by the main conveyer roller 34 to the discharge roller 35, which conveys the sheets downstream to be ejected out of the sheet feeding path. The ejected sheets are settled in the discharge tray 43.

When the scanner unit 3 serves as the ADF-typed image scanner, moreover, the first image sensor 11 is moved to a position below the first presser piece 23 and stopped thereat. Meanwhile, the second image sensor 12 is fixed to a position below the second presser piece 24 and is not movable in the widthwise direction from the position.

As the document sheet is conveyed in the sheet feeding path in a section between the intermediate conveyer roller 33 and the main conveyer roller 34, the document sheet is carried in clearance between the second ADF glass 22 and the second presser piece 24. In this regard, as the document sheet is moved in the auxiliary direction whilst the second image sensor 12 is fixed in the position, a plurality of pixels aligned in lines orthogonally to the auxiliary direction on a back side of the sheet are scanned sequentially, and the image formed on the back side of the sheet is read.

As the document sheet is further conveyed in the sheet feeding path in a section between the main conveyer roller 34 and the discharge roller 35, the document sheet is carried in clearance between the first ADF glass 21 and the first presser piece 23. In this regard, as the document sheet is moved in the auxiliary direction whilst the first image sensor 11 is fixed in the position, a plurality of pixels aligned in lines orthogonally to the auxiliary direction on a front side of the sheet are scanned sequentially, and the image formed on the front side of the sheet is read. The read image is converted into electrical signals and transmitted to a controller (not shown) of a controller board 47 to be processed.

[Arrangement of Cables and Harnesses in the MFP]

Next, arrangement of cables and harnesses in the MFP 1 will be described. The MFP 1 is provided with an ADF driving motor 45 and a controller board 47 (see FIGS. 1A-1C).

The controller board 47 includes a controller (not shown) to control image-processing behaviors of the MFP 1 and is arranged in a front section in the main unit 2. The controller board 47 is connected with the first image sensor 11 via a first flexible flat cable (FFC) 51 and with the second image sensor 12 via a second FFC 52. The controller board 47 and the ADF driving motor 45 are connected with each other via a wire harness 53. The driving motor 45 is arranged in a rear area in the scanner unit 3.

As shown in FIG. 1A, the first FFC 51 includes a section extending from a rear end of the first image sensor 11 and drawn along the widthwise (left-right) direction in the rear section of the flatbed unit 5. The left-right extending section moves and deforms to follow the first image sensor 11 moving in the auxiliary direction.

The first FFC 51 includes a rearward-extending section extending from a right-side end of the left-right extending section toward the rear end of the flatbed unit 5 and a section extending downward from a rear end of the rearward-extending section. The first FFC 51 is turned to be directed frontward at a lower end of the rear section and bended further to be directed in the main unit 2 to the controller board 47.

The second FFC 52 includes a rearward-extending section extending rearward from a rear end of the second image sensor 12 in the cover unit 7. The second FFC 52 is turned at a rear end of the cover unit 7 to extend rightward along an inner surface of the cover unit 7. The second FFC 52 is turned toward the rear end of the cover unit 7 at a position, in which the first FFC 51 is turned rearward. The rearward-turned section of the first FFC 51 and the rearward-turned section of the second FFC 52 may vertically coincide with each other, although the two rearward-turned sections are shown to be apart from each other in FIGS. 1A and 1C for better visibility.

The second FFC 52 includes a section, which extends vertically from a rear end of the rearward-turned section and is drawn vertically through the flatbed unit 5 and in the main unit 2. In particular, the FFC 52 is deformed in curvature (see FIG. 5) to allow vertical movement of the cover unit 7 at the vertically-extending section. The second FFC 52 is further turned from the vertically-extending section to be directed in the main unit 2 to the controller board 47.

The wire harness 53 connecting the ADF driving motor 45 and the controller board 47 includes a section extending leftward from the ADF driving motor 45 and a section extending rearward from the leftward-extending section. The wire harness 53 is further turned downward at the rear end of the rearward-extending section and frontward at a lower end of the rearward-extending section to be directed in the main unit 2 to the controller board 47. Thus, starting from the ADF driving motor 45, the wire harness 53 extends in an opposite direction from the direction of the left-right extending sections of the first and second FFCs 51, 52. Moreover, an area in which the wire harness 53 is directed in the main unit 2 is separated from the areas in which the first and second FFCs 51, 52 are directed in the main unit 2 (see FIG. 1A).

Figure 3:
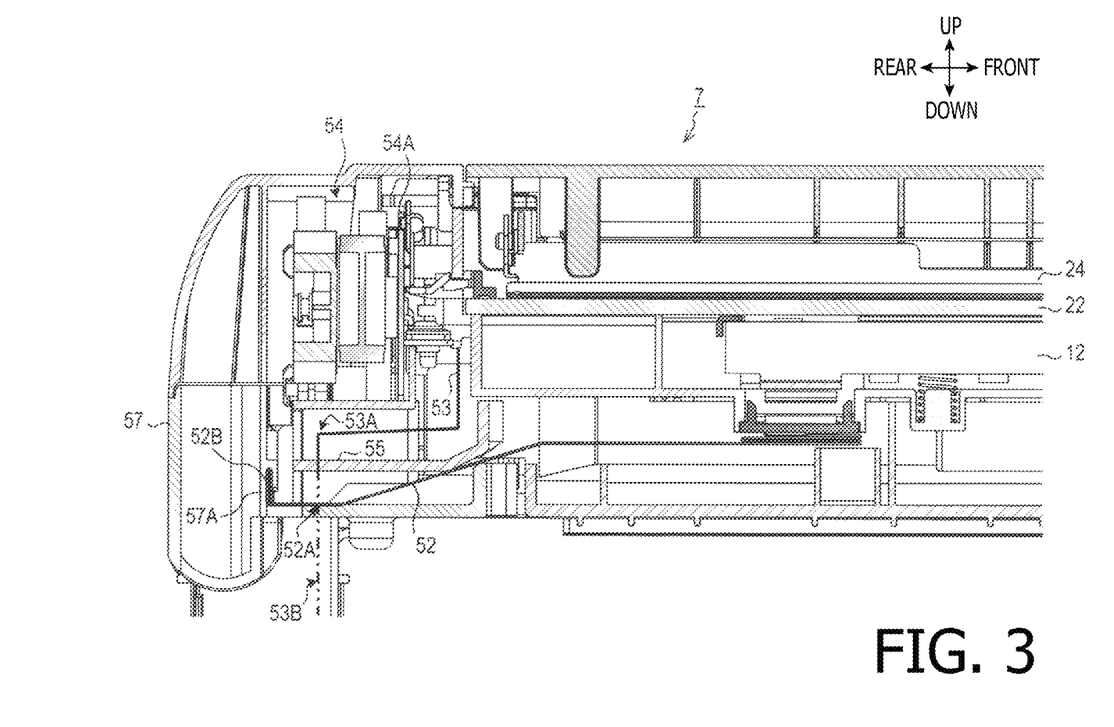
FIG. 3 is a cross-sectional partial view of the scanner unit in the MFP according to the embodiment of the present invention showing arrangement of a second flexible flat cable (FFC) and a wire harness.

The arrangement of the cables 51, 52 and the wire harness 53 will be described more in detail with reference to FIG. 3. FIG. 3 shows a cross-sectional and partial view of the scanner unit 2, in which the second FFC 52 and the wire harness 53 cross over, viewed from a left-hand side of the MFP 1.

As shown in FIG. 3, the cover unit 7 is equipped with a driving system 54 to drive the rollers including the feed roller 31, the separator roller 32, the intermediate conveyer roller 33, the main conveyer roller 34, and the discharge roller 35.

The driving system 54 has a frame 54A, which supports movable component including the rollers. The rearward-extending section of the second FFC 52 extending from the second image sensor 12 is arranged below the frame 54A in a downwardly-inclined posture and directed further toward the rear end of the cover unit 7. In this regard, the second FFC 52 is crossed over at a crossover section 52A, which is below the frame 54A, by a crossover section 53A of the wire harness 53, and the second FFC 52 and the wire harness 53 are arranged with substantial height of clearance maintained there-between.

The cover unit 7 has a bulkhead 55 in an area, in which the wire harness 53 crosses over the second FFC 52, to separate the crossover section 53A of the wire harness 53 from the crossover section 52A of the second FFC 52. The bulkhead 55 is formed integrally with resin external covering 57 of the cover unit 7. With the bulkhead 55, the second FFC 52 is prevented from being in contact with the wire harness 53 when, for example, the wire harness 53 deforms according to the movement of the cover unit 7.

A vertically-extending section 53B of the wire harness 53, which extends continuously from the crossover section 53A and is indicated by a double-dotted line in FIG. 3, extend vertically and directed in the main unit 2. The vertically-extending section 53B extends downwardly in an area, which is closer to the left-side end of the cover unit 7 (i.e., a viewer's nearer side in FIG. 3) with respect to the second FFC 52, with substantial clearance maintained there-between.

According to the above arrangement, the second FFC 52 and the wire harness 53 are arranged within the cover unit 7 without being drawn in parallel with each other and are prevented from being in contact with each other. Therefore, the second FFC 52 is prevented from being affected by electrical noises released from the wire harness 53, and interference of the noises with signals being transmitted in the second image sensor 12 is prevented. Thus, imaging quality of the second image sensor 12 can be maintained.

Figure 4:
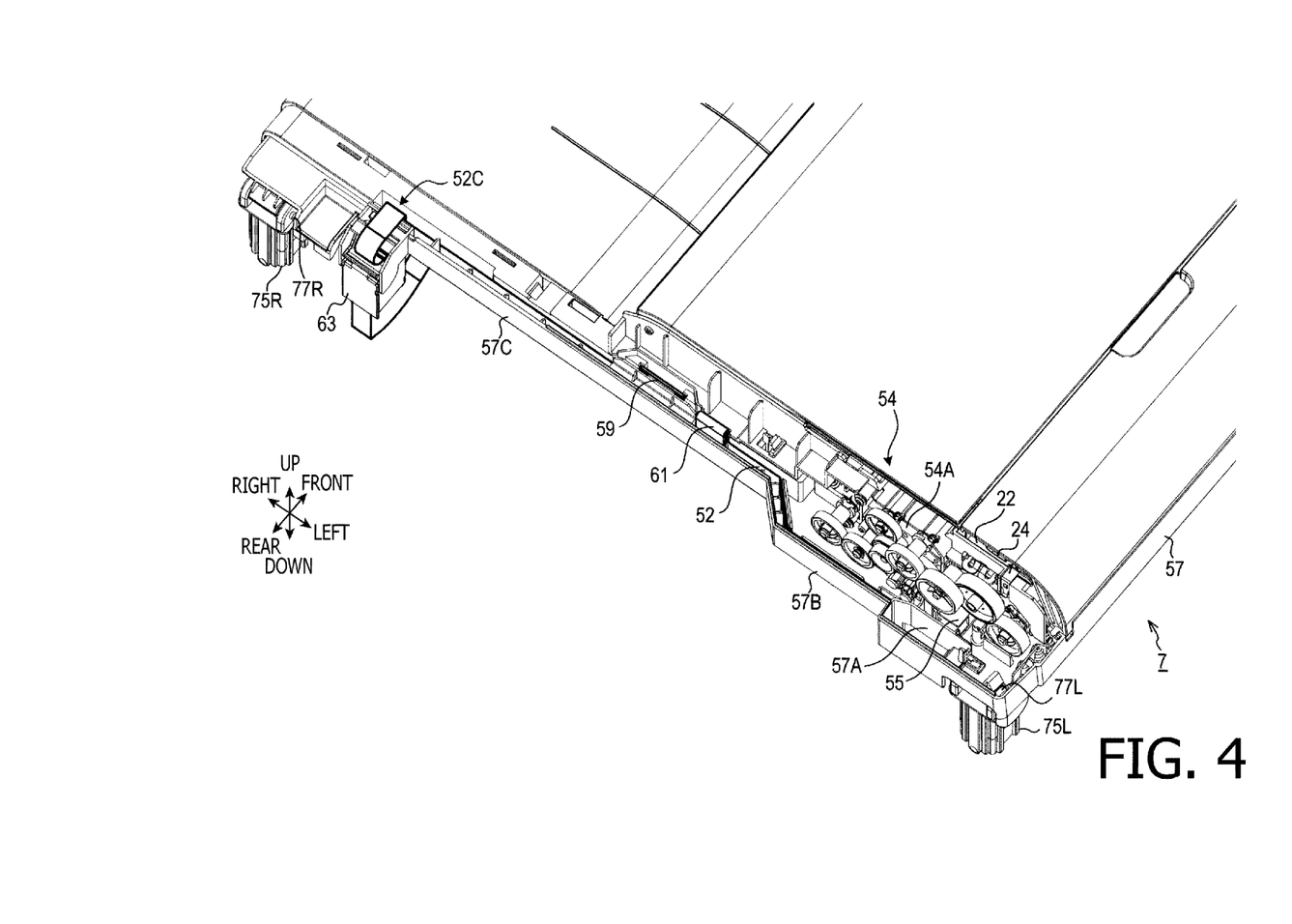
FIG. 4 is a perspective partial view of the scanner unit in the MFP according to the embodiment of the present invention showing arrangement of the second FFC in a rear section of the scanner unit.

As shown in FIG. 4, the second FFC 52 extends further rearward from crossover section 52A to be directed to reach a rear section 57A of the external covering 57 of the cover unit 7. The second FFC 52 is turned thereat to extend rightward (i.e., a viewer's further side in FIG. 3) at section 52B.

The second FFC 52 is further drawn rightward (i.e., in the left-right direction) along the inner surface of a rear section 57B of the external covering 57 to be connected to an intermediate board 59 at a center area of width between the left-side end and the right-side end of the cover unit 7. Therefore, the second FFC 52 is divided in an upstream section and a downstream section by the intermediate board 59.

Thus, the intermediate board 59 is arranged in the second FFC 52 to amplify signals transmitted from the upstream section of the second FFC 52 and transmits the amplified signals in the downstream section of the FFC 52. Therefore, even if the second FFC 52 is arranged in a greater length, the signals which may otherwise be attenuated can be amplified and transmitted steadily in the second FFC 52, and imaging quality of the second image sensor 12 can be maintained. The second FFC 52 is provided with a flat magnetic core 61, which restricts electrical noises in the second FFC 52, at a position in the upstream section.

The downstream section of the second FFC 52 extends further along the inner surface of a rear section 57C of the external covering 57 and turns rearward at a section 52C, in which the second FFC 52 reaches in vicinity of an FFC holder 63, and is drawn in the FFC holder 63.

The FFC holder 63 (see FIG. 5) is inserted through an opening in a holder socket 65, which is a vertical hole formed in the flatbed unit 5, and movable in the holder hole 65 along with the cover unit 7 when the cover unit 7 moves vertically with respect to the flatbed unit 5. The FFC holder 63 is attached to the cover unit 7 and rotatable with respect to the cover unit 7. Therefore, when the cover unit 7 rotates with respect to the flatbed unit 5, positional relation between the FFC holder 63 and the flatbed unit 5 is maintained, and the cover unit 7 rotates also with respect to the FFC holder 63.

Figure 5:
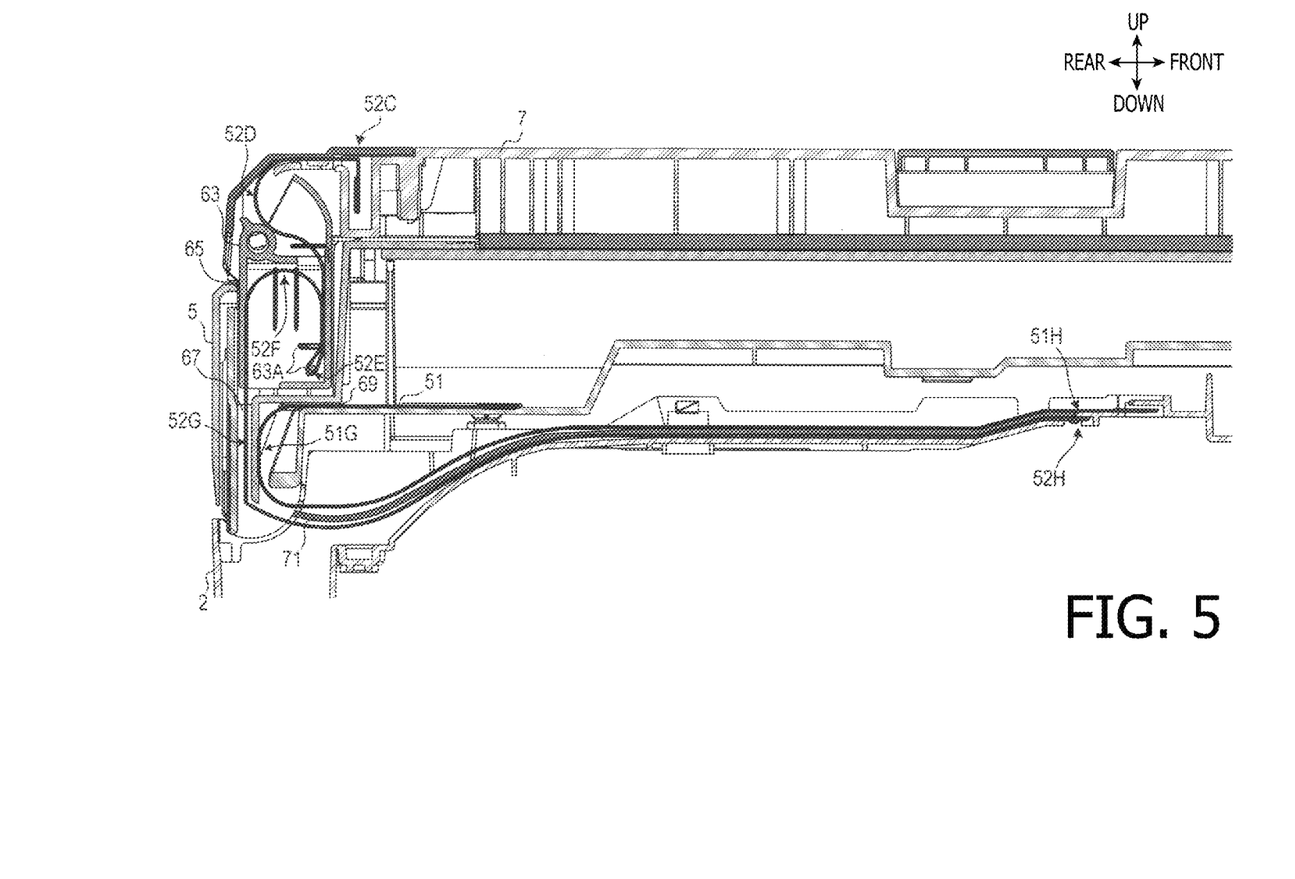
FIG. 5 is a cross-sectional partial view of the scanner unit in the MFP according to the embodiment of the present invention showing arrangement of a first FFC and the second FFC.

The second FFC 52 turned at the section 52C is drawn in the FFC holder 63 in a rearwardly curved posture at a curved section 52D and directed further in a lower section of the FFC holder 63.

In the lower section, the second FFC 52 is fixed partially to a fixing section 63A of the FFC holder 63 at a fixed section 52E. The second FFC 52 extends further in an upwardly-curved posture at a curved section 52F from the fixed section 52E and directed outside the FFC holder 63 at a vertically-extending section 52G.

According to the arrangement of the second FFC 52, when the cover unit 7 rotates with respect to the flatbed unit 5, the rearwardly-curved section 52D deforms to absorb the rotation movement of the cover unit 7 along with cover unit 7. Meanwhile, when the cover unit 7 moves vertically with respect to the flatbed unit 5, the upwardly-curved section 52F deforms to absorb the vertical movement of the cover unit 7 along with the cover unit 7. Therefore, the cover unit 7 is movable without being interfered with by the second FFC 52. Further, due to the arrangement of the second FFC 52 in the FFC holder 63, the second FFC 52 can absorb the stress which may be caused by the rotation and vertical movements of the cover unit 7 effectively.

The vertically-extending section 52G of the second FFC 52 is directed in a path 67, which is formed in the flatbed unit 5, to be drawn outside the flatbed unit 5 and in the main unit 2. In the main unit 2, the second FFC 52 is turned to be directed frontward.

Meanwhile, the first FFC 51 is directed in a path 69 in the flatbed unit 5 and extends vertically in a section 51G. The first FFC 51 is further directed outside the flatbed unit 5 and in the main unit 2. In the main unit 2, the first FFC 51 is directed frontward.

The first FFC 51 and the second FFC 52 are arranged to vertically overlap each other in layers at vertically-extending sections 51G, 52G and at frontward-extending sections 51H, 52H, which extend from the vertically-extending sections 51G, 52G respectively, in the main unit 2.

In a large part of the overlapping frontward-extending sections 51H, 52H, an FFC spacer 71 to separate the first FFC 51 and the second FFC 52 from each other is arranged. The FFC spacer 71 is a resin plate having thickness of, for example, 1 mm, which is integrally formed with the external covering of the main unit 2. With the spacer 71, the first FFC 51 and the second FFC 52 are prevented from being too close or in contact with each other. Accordingly, the first FFC 51 is prevented from being affected by electrical noises from the second FFC 52, and vice versa. Thus, quality of the signals entering the controller board 47 is steadily maintained.

Figure 6A:
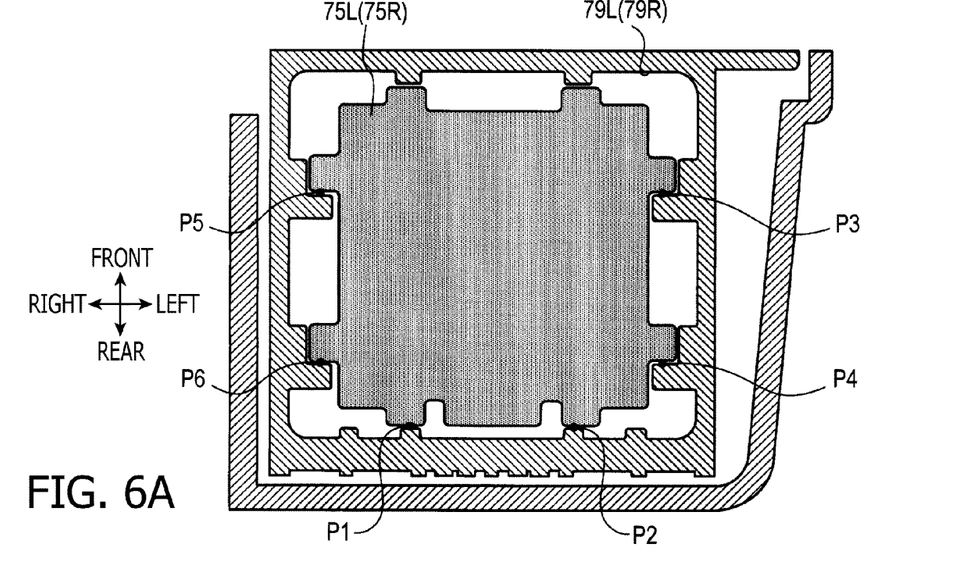
FIG. 6A is a cross-sectional view of a pillar supported at a left-side section, a right-side section, and a rear-side section of a pillar socket in the MFP according to the embodiment of the present invention.
Figure 6B:
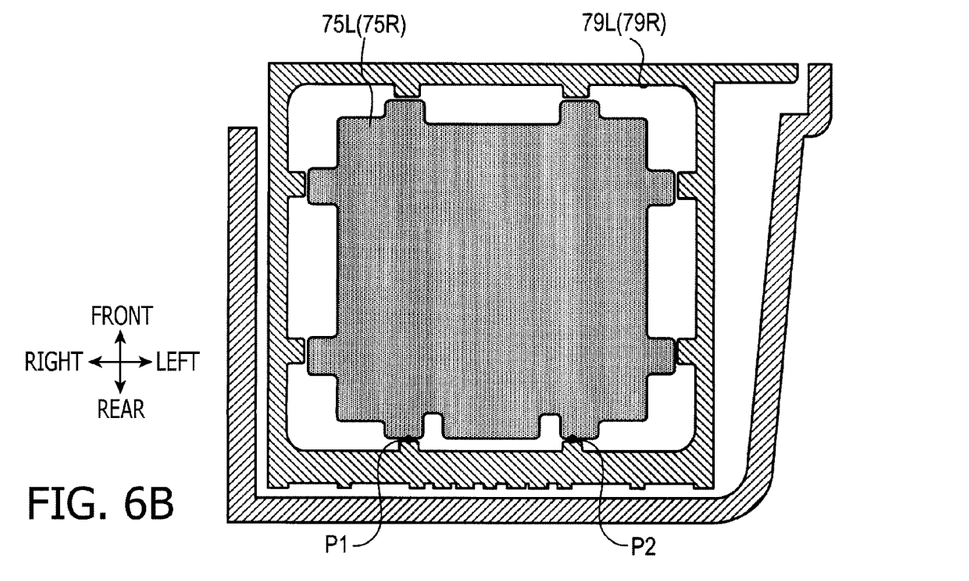
FIG. 6B is a cross-sectional view of the pillar supported solely at the rear-side section of a pillar socket in the MFP.

In the cover unit 7 of the MFP 1, a pair of pillars 75L, 75R is arranged on the rear side (see FIG. 4). The pillars 75L, 75R are inserted through openings in pillar sockets 79L, 79R (see FIG. 6), which are vertical holes formed in the flatbed unit 5. The pillars 75L, 75R are formed to have hinges 77L, 77R respectively, to which the cover unit 7 is rotatably attached. Therefore, the cover unit 7 is rotatable about the hinges 77L, 77R with respect to the pillars 75L, 75R and the flatbed unit 5.

With the above configuration, the pillars 75L, 75R are vertically movable along with the cover unit 7 with respect to the flatbed unit 5 when the cover unit 7 moves vertically with respect to the flatbed unit 5. Further, the cover unit 7 is rotatable about the hinges 77L, 77R with respect to the flatbed unit 5. When the cover unit 7 rotates with respect to the flatbed unit 5 about the hinges 77L, 77R, positional relation between the pillars 75L, 75R and the flatbed unit 5 is maintained, and the cover unit 7 rotates also with respect to the pillars 75L, 75R.

When the cover unit 7 widely opens to expose the top of the flatbed unit 5, a gravity center of the cover unit 7 moves rearward. Accordingly, the pillars 75L, 75R become subjected to stress to lay down the pillars 75L, 75R, and the stress also affects the pillar sockets 79L, 79R via the pillars 75L, 75R.

In order to avoid stress concentration on the pillar sockets 79L, 79R, therefore, each of the pillars 75L, 75R is formed to have projecting surfaces, which are to become in contact with inner surfaces of the pillar sockets 79L, 79R at contact points P1-P6 on three sides, i.e., a left-hand side, a right-hand side, and a rear side. Further, each of the pillar sockets 79L, 79R is formed to have projecting surfaces in positions corresponding to the projecting surfaces of the pillars 75L, 75R. Thus, the pillars 75L, 75R are supported by the pillar sockets 79L, 79R at the contact points P1-P6 (see FIG. 6A).

With the plurality of contact points P1-P6, the stress applied to the pillars 75L, 75R is distributed, and the stress concentration on a specific part of the pillar sockets 79L, 79R can be avoided. Therefore, damages which may otherwise be caused by the stress concentration can be avoided.

For example, when the stress is applied the pillars 75L, 75R, having the shape described above but supported by the pillar sockets 79L, 79R only at the contact surfaces P1, P2 formed on the rear side (see FIG. 6B), the stress is concentrated on the contact surfaces P1, P2 and transmitted to the pillar sockets 79L, 78R only through the contact surfaces P1, P2. Therefore, in order to avoid the damage by the stress concentration, the pillar sockets 79L, 79R are required to be enhanced in the areas corresponding to the contact points P1, P2.

Meanwhile, when the pillars 75L, 75R and the pillar sockets 79L, 79R are formed to have the projecting surfaces in positions corresponding to the contact points P3-P6 in addition to the contact points P1, P2, the stress concentration is thus avoided, and specific enhancement of the pillars 75L, 75R or the pillar sockets 79L, 79R is not necessary. Therefore, the pillar sockets 79L, 79R can be designed with less restriction, and damages which may otherwise be caused by the lack of enhancement can be avoided effectively.

In the cover unit 7 as described above, the left-right section of the second FFC 52 extending along the inner surface of the rear sections 57A-57C of the external covering 57 is arranged in between the hinges 77L, 77R. In this regard, the hinges 77L, 77R are arranged in positions apart from each other in the vicinities of the left-side end and the right-side end of the cover unit 7 so that the area between the hinges is assured in order to secure smooth and stable rotation movement of the cover unit 7. Therefore, when the cover unit 7 is assembled, the second FFC 52 is not necessarily arranged over or around the hinges 77L, 77R, but can be placed linearly in the cover unit 7 without being interfered with by the hinges 77L, 77R. In the linear arrangement, room for the detouring part of the second FFC 52 can be omitted from the cover unit 7, and at least the cover unit 7 in the MFP 1 can be downsized.

[Effects]

According to the MFP 1 as described above, the second FFC 52 is arranged to have the section extending from the second image sensor 12 to be drawn in the lower position below the frame 54A to the rear section of the cover unit 7 to reach the external covering 57. Therefore, unlike an ADF with an FFC arranged to detour the rollers and the driving system, the second FFC 52 according to the present embodiment can be arranged without being unnecessarily twisted or bended, and the stress to the second FFC 52 can be reduced.

Further, the second FFC 52 turns to extend in the left-right direction along the inner surfaces of the external covering 57 from the rear section of the external covering to reach an outlet of the cover unit 7 (i.e., the opening of the FFC holder 63) and to be drawn through the flatbed unit 5. Thus, whilst the second FFC 52 is arranged linearly, the second FFC 52 can be arranged without being unnecessarily twisted or bended at the left-right extending section.

In the above-described arrangement, further, the left-right extending section of the second FFC 52 is drawn in an area, which is closer to the rotation axis of the cover unit 7. Therefore, an amount of deformation of the second FFC 52 according to the rotation movement of the cover unit 7 can be reduced, compared to an amount of deformation of an FFC being arranged, for example, in a front section further from the rotation axis of the cover unit 7. Thus, the second FFC 52 can be prevented from being exposed to unnecessary external force or joggles, which may be caused by a larger amount of deformation.

Moreover, according to the above-described configuration, the second FFC 52 is arranged in the cover unit 7 in the orientation, in which a direction of thickness of the FFC 52 coincides with the direction of depth of the MFP 1 at the left-right extending section extending along the inner surfaces of the sections 57A-57C to the vicinity of the opening of the FFC holder 63. Therefore, a plane area to be occupied by the left-right extending section of the second FFC 52 is reduced to be smaller than an area, which is occupied by the second FFC being laid flat with the thickness coincident with the vertical direction, and internal space of the MFP 1 can be efficiently used.

In the MFP 1 described above, the first FFC 51 and the second FFC 52 are arranged partially in parallel with each other at the sections extending from the rear of the main unit 2 frontward to the controller board 47. Therefore, unlike an MFP, in which the first FFC and the second FFC are arranged in separate areas from each other, room for the rear-front extending section of the first FFC 51 and room for the rear-front extending section of the second FFC 52 in the main unit 2 can be combined to be reduced, and the MFP 1 can be downsized.

Further, the first FFC 51 and the second FFC 52 according to the embodiment are arranged in the orientation, in which the direction of the thickness thereof coincides with the vertical direction of the MFP 1 at the rear-front extending sections arranged in layers. Therefore, compared to the FFCs arranged in an orientation, in which the direction of thickness coincides with other direction than the vertical direction (e.g., the widthwise direction or the direction of depth), the first FFC 51 and the second FFC 52 can be arranged in clearance, of which height is smaller. Accordingly, the MFP 1 can be downsized in height thereof.

Moreover, according to the above-described configuration, the second FFC 52 is arranged in the cover unit 7 in the orientation, in which the direction of thickness of the FFC 52 coincides with the front-rear direction of the MFP 1 at the left-right extending section extending along the inner surfaces of the sections 57A-57C to the vicinity of the opening of the FFC holder 63. Therefore, a plane area to be occupied by the left-right extending section of the second FFC 52 is reduced to be smaller than an area, which is occupied by the second FFC being laid flat with the thickness coincident with the vertical direction, and internal space of the MFP 1 can be efficiently used.

Furthermore, in the MFP 1 described above, the first FFC 51 and the second FFC 52 are arranged partially in layers at the sections extending in parallel with each other from the rear of the main unit 2 frontward to the controller board 47. Therefore, unlike an MFP, in which the first FFC and the second FFC are arranged in separate areas from each other, one of a plane area for the rear-front extending section of the first FFC 51 and a plane area for the rear-front extending section of the second FFC 52 can be omitted, and the MFP 1 can be downsized.

[More Examples]

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, resin components to be integrally formed with the external covering of the MFP 1, such as the bulkhead 55 and the FFC spacer 71, may be formed separately from the external covering or integrally with other components in the MFP 1.

For another example, the scanner unit 3 to read the image may not necessarily be included in the MFP 1, but may be configured to be a single independent scanning device.

What is claimed is:

1. An image reading apparatus configured to read an image formed on a document sheet, comprising:
    a lower unit;
    an upper unit arranged on top of the lower unit and rotatably attached to the lower unit via a hinge to rotate about a rear end of the upper unit with respect to the lower unit; and
    at least one image reader configured to read the image formed on the document sheet,
    wherein the upper unit includes a sheet conveyer, which is configured to convey the document sheet in a sheet-feeding path, an upper image reader, which is one of the at least one image reader configured to read the image formed on the document sheet being conveyed, and an external covering to accommodate the sheet conveyer and the upper image reader;
    wherein the lower unit includes a controller configured to control image-processing of the image read by the at least one image reader;
    wherein the sheet conveyer includes rollers, a driving source configured to drive the rollers, and a frame to support the rollers and the driving source;
    wherein the at least one image reader and the controller are connected with each other via a flat cable;
    wherein the flat cable connecting the upper image reader with the controller has a rearward-extending section and a widthwise-extending section;
    wherein the rearward-extending section extends rearward from the upper image reader along a front-rear direction and is drawn in an area below a part of the frame and to a rear section of the upper unit to reach an inner surface of the external covering at the rear end of the upper unit;
    wherein the widthwise-extending section extends from the rear end of the upper unit along the inner surface of the external covering in a direction orthogonal to the front-rear direction to reach an outlet of the upper unit and is directed to the lower unit via the outlet; and wherein the widthwise-extending section of the flat cable connecting the upper image reader with the controller is arranged in an orientation, in which a direction of thickness thereof coincides with the front-rear direction.

2. The image reading apparatus according to claim 1, wherein the upper unit includes an intermediate amplifier, which is configured to amplify signals being transmitted in the flat cable, in an intermediate position in the widthwise-extending section of the flat cable.

3. The image reading apparatus according to claim 1,
wherein the hinge includes a pair of hinges arranged to be apart from each other along the orthogonal direction; and
wherein the widthwise-extending section of the flat cable connecting the upper image reader with the controller is arranged in an area between the pair of hinges.

4. The image reading apparatus according to claim 1,
wherein the at least one image reader includes a lower image reader, which is arranged in the lower unit and configured to read an image formed on one side of the document sheet, while the upper image reader reads an image formed on the other side of the document sheet;
wherein the lower image reader is connected with the controller via a different flat cable, which is different from the flat cable connecting the upper image reader with the controller; and
wherein the flat cable connecting the upper image reader with the controller and the different flat cable connecting the lower image reader with the controller are arranged to extend partially in parallel with each other.

5. The image reading apparatus according to claim 4, wherein the flat cable and the different flat cable are arranged in layers in an orientation, in which a direction of thickness thereof coincides with a vertical direction, at the parts extending in parallel with each other.

6. The image reading apparatus according to claim 4, wherein a spacer to avoid the flat cable and the different flat cable from becoming in contact with each other is arranged between the parts of the flat cable and the different flat cable extending in parallel with each other.

7. The image reading apparatus according to claim 1,
wherein the sheet conveyer is connected with the controller via a wire harness;
wherein the wire harness and the flat cable are arranged to crossover each other with clearance maintained therebetween; and
wherein the wire harness and the flat cable are separated from each other at the parts to crossover each other by a separator.

* * * * *